Patented June 27, 1939

2,164,092

UNITED STATES PATENT OFFICE 2,164,092

PROCESS OF PREPARING SOLID ALKALINE COMPOUNDS

George W. Smith, Pittsburgh, Pa., assignor to Hall Laboratories, Inc., Pittsburgh, Pa., a corporation of Pennsylvania No Drawing. Application June 12, 1936, Serial No. 84,875

5 Claims. (Cl. 23—107)

This invention relates to a process of preparing solid alkaline compounds from solutions without the necessity of evaporating the water from the solution.

The present invention is useful in obtaining solid alkaline compounds from solutions of alkali-metal metaphosphates or pyrophosphates by the addition of alkalies, for example sodium carbonate or sodium hydroxide, to the solution. The addition of an alkali to a solution of an alkali-metal metaphosphate aids in converting the metaphosphate into the orthophosphate or pyrophosphate. This conversion, in the case of sodium hexametaphosphate, involves the absorption of water by the metaphosphate in accordance with the equations $Na_6P_6O_{18}+6H_2O=6NaH_2PO_4$ or $Na_6P_6O_{18}+3H_2O \rightarrow 3Na_2H_2P_2O_7$ and results in drying the solution. If the amount of water and alkali present in the solution is controlled so as to be sufficient to convert only a part of the metaphosphate, then a product containing sodium metaphosphate, sodium orthophosphate and sodium pyrophosphate can be obtained by this process.

The only other method of getting completely anhydrous sodium hexametaphosphate from a solution containing the same is by evaporating the water and heating the residue to the temperature of fusion and casting the fused metaphosphate on a cold surface. Even if the residue from a metaphosphate solution is dried for several days at ordinary temperatures, considerable water remains in the residue. If the residue is heated, reversion of the metaphosphate to the orthophosphate starts to occur, mixtures of acid pyrophosphate, dihydrogen orthophosphate and metaphosphate are obtained, and unless the heating is maintained for a considerable period at moderate temperatures, some free moisture still remains. If the temperature of heating is raised, the product is contaminated with insoluble metaphosphate. These objections are overcome in the present invention by the addition of an alkali to the metaphosphate solution so as to aid the reversion of a part of the metaphosphate to orthophosphate.

The particular advantage of using the sodium metaphosphate or pyrophosphate in the presence of alkalies is that the rehydration reaction by which the metaphosphate or pyrophosphate is converted into the orthophosphate $(NaPO_3+H_2O=NaH_2PO_4$ or $Na_4P_2O_7+H_2O=2Na_2HPO_4)$ runs so strongly to the right that the reaction is capable of extracting water from a concentrated solution of sodium metaphosphate or pyrophosphate in the presence of alkalies. The water cannot be removed from the metaphosphate solution by the ordinary crystallization reaction, such as $Na_2SO_4+7H_2O=Na_2SO_4.7H_2O$. This is shown by the fact that if anhydrous sodium sulphate, a non-alkaline material, be added to a very strong solution of sodium metaphosphate, the sirupy or pasty consistency persists despite the fact that sodium sulphate is capable of absorbing water of crystallization from certain solutions. The present invention therefore is not concerned with the ordinary methods of crystallizing solids from solution by adding a material which takes on water of crystallization. In the present process, the sodium metaphosphate or pyrophosphate is actually converted at least in part into the orthophosphate.

The invention is applicable to the preparation of solid alkaline compounds in general. Thus, a solution of sodium carbonate or sodium hydroxide or other alkali may be converted into a solid alkaline compound by adding an alkali-metal metaphosphate or pyrophosphate to the solution. Even where the solution to be dried up is not alkaline, it may be converted into a solid alkaline compound by adding to it an alkali and an alkali-metal metaphosphate or pyrophosphate. Wherever it is desired to eliminate water from a solution, it may be done by adding an alkali, if the solution is not already alkaline, and an alkali-metal metaphosphate or pyrophosphate and mixing so as to cause the water to be utilized in converting the metaphosphate or pyrophosphate, at least in part, into the orthophosphate.

One use of the invention is the production of a physically homogeneous non-segregating solid alkaline compound for use in boiler water treatment. Another use is to obtain in briquet form a mixture of alkalies suitable for use in treating feed water for small boilers where it is desired, as is often the case, to introduce the alkalies in the form of briquets to be dissolved by the flow of water.

Another use of the invention is to prepare a detergent briquet which may be used in dish washing machines, the slow rate of solubility of the briquet giving better maintenance of alkalinity in the dish washing machine than the periodic addition of granulated or powdered alkali.

Another use of the invention is in the preparation of a homogeneous alkaline material in briquet or coarsely granular form for use as a radiator cleaner.

The following are given as examples of the manner in which the invention may be carried out.

Example I

Sodium carbonate, sodium metaphosphate and water in the proportions of about 30% sodium carbonate, 30% sodium metaphosphate and 20% water are thoroughly mixed. This produces a plastic mass which on being discharged from the mixing apparatus into a receiver gradually hardens over the course of 24 to 48 hours. During the mixing and hardening period, two reactions occur. First, a portion of the water reacts with the sodium carbonate to form a hydrated sodium carbonate such as $Na_2CO_3.H_2O$ or possibly $Na_2CO_3.10H_2O$. Second, a portion of the water reacts with the sodium metaphosphate to convert it into orthophosphate, which, reacting with the sodium carbonate, produces a mixture of orthophosphates which also are hydrated. One such reaction would be $$Na_6P_6O_{18} + 3Na_2CO_3 + 15H_2O \rightarrow 6Na_2HPO_4.2H_2O + 3CO_2.$$

The conversion of the metaphosphate into orthophosphate is aided by the presence of the sodium carbonate.

If sufficient water and sodium carbonate are employed with the sodium metaphosphate, substantially all of the sodium metaphosphate is converted into orthophosphates, so that the solid composition contains sodium orthophosphates and sodium carbonate. If, however, insufficient water is employed to convert all of the sodium metaphosphate into sodium orthophosphate, then the solid product will contain some unconverted sodium metaphosphate in addition to the orthophosphates and carbonates.

*Example II*

50 grams sodium hexametaphosphate, 50 grams sodium hydroxide, and 25 grams of water are mixed together. The sodium hydroxide goes into solution quite rapidly, generating considerable quantities of heat, and within the space of one-half hour a solid product is obtained. In this case the strong causticity of the sodium hydroxide accelerates the rehydration of the sodium metaphosphate to orthophosphate and a mixture containing NaOH, $Na_3PO_4.H_2O$ and $$Na_3PO_4.12H_2O$$

is obtained. In this case, as in the case of mixtures with sodium carbonate, some sodium metaphosphate may be left unchanged due to some of the water being absorbed as water of crystallization before it has a chance to react with the sodium metaphosphate. However, if sufficient caustic soda and water be added so that the proportions present in the final product are those corresponding to $Na_3PO_4.12H_2O$, there will be little or no sodium metaphosphate remaining unchanged. This example provides a method of preparing alkali orthophosphates from alkali metaphosphates.

Instead of using the alkali-metal metaphosphates or pyrophosphates, I may use metaphosphoric or pyrophosphoric acid since these acids are converted in alkaline solution into the alkali-metal metaphosphates or pyrophosphates.

The meta and pyro salts and acids may be considered as molecularly dehydrated forms of the ortho salts and acids since the hydration effects an atomic re-arrangement within the phosphate molecule as distinguished from the so-called dehydration of orthophosphates by heating merely to drive off water of crystallization, or the double decomposition reactions characterizing hydrolysis. Therefore, for convenience, I employ the expression "molecularly dehydrated alkali-metal phosphate" to designate the alkali-metal-metaphosphate or pyrophosphate as distinguished from the alkali-metal orthophosphate from which merely water of crystallization has been driven off.

Although I have referred to "solution", it will be understood that this term is intended to include not only true solutions, but thick sirupy solutions or even pastes and that the invention is applicable for forming solid alkaline compounds from pastes as well as true solutions.

While I prefer to use sodium metaphosphate or sodium pyrophosphate, other alkali-metal metaphosphates or pyrophosphates may be used, such, for example, as the metaphosphates or pyrophosphates of potassium, lithium and ammonium. The metaphosphates are preferably used in the soluble form commonly known as hexametaphosphates.

The invention is not limited to the specific examples, but may be otherwise embodied or practiced within the scope of the following claims.

I claim:

1. A process of preparing solid alkaline compounds from alkaline solutions of an alkali-metal compound, which comprises reacting a molecularly dehydrated alkali-metal phosphate with the solution without application of extraneous heat and in such manner as to convert at least a part of the molecularly dehydrated alkali-metal phosphate into orthophosphate, the molecularly dehydrated alkali-metal phosphate being employed in amount sufficient to use up substantially all of the water of the alkaline solution, thereby producing a solid product.

2. A process of preparing solid alkaline compounds from alkaline solutions of an alkali-metal compound, which comprises reacting an alkali-metal metaphosphate with the solution without application of extraneous heat and in such manner as to convert at least a part of the alkali-metal metaphosphate into orthophosphate, the alkali-metal metaphosphate being employed in amount sufficient to use up substantially all of the water of the alkaline solution, thereby producing a solid product.

3. A process of preparing solid alkaline compounds from alkaline solutions of an alkali-metal compound, which comprises reacting an alkali-metal hexametaphosphate with the solution without application of extraneous heat and in such manner as to convert at least a part of the alkali-metal hexametaphosphate into orthophosphate, the alkali-metal hexametaphosphate being employed in amount sufficient to use up substantially all of the water of the alkaline solution, thereby producing a solid product.

4. A process of preparing solid alkaline compounds from alkaline solutions of an alkali-metal compound, which comprises reacting sodium hexametaphosphate with the solution without application of extraneous heat and in such manner as to convert at least a part of the sodium hexametaphosphate into sodium orthophosphate, the sodium hexametaphosphate being employed in amount sufficient to use up substantially all of the water of the alkaline solution, thereby producing a solid product.

5. A process of preparing solid trisodium orthophosphate, which comprises reacting without application of extraneous heat, a molecularly dehydrated alkali-metal phosphate and sodium hydroxide in the presence of water in amount sufficient to convert the major portion of the molecularly dehydrated alkali-metal phosphate into orthophosphate, the molecularly dehydrated alkali-metal phosphate being employed in amount sufficient to use up substantially all of the water, thereby producing a solid product.

GEORGE W. SMITH.